United States Patent
Roschat et al.

(10) Patent No.: US 9,309,007 B2
(45) Date of Patent: Apr. 12, 2016

(54) JIG FOR THE MODELLING OF AT LEAST ONE SECTION OF AN AIRCRAFT FUSELAGE

(75) Inventors: Bernd Roschat, Nordermeldorf (DE); Niklas Halfmann, Hamburg (DE); Dieter Krause, Buchholz (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 593 days.

(21) Appl. No.: 13/483,186

(22) Filed: May 30, 2012

(65) Prior Publication Data

US 2013/0206710 A1 Aug. 15, 2013

Related U.S. Application Data

(60) Provisional application No. 61/491,346, filed on May 31, 2011.

(30) Foreign Application Priority Data

May 31, 2011 (DE) .......................... 10 2011 076 841

(51) Int. Cl.
*B64F 5/00* (2006.01)

(52) U.S. Cl.
CPC ................ *B64F 5/00* (2013.01); *B64F 5/0009* (2013.01)

(58) Field of Classification Search
CPC ................................ B65F 5/0009; B65F 5/00
USPC .......... 29/281.1, 281.5, 428, 897.2; 211/13.1; 244/119
See application file for complete search history.

(56) References Cited

U.S. PATENT DOCUMENTS

| 5,825,998 | A | 10/1998 | Brechner | |
|---|---|---|---|---|
| 6,671,941 | B2 * | 1/2004 | Scott et al. | ................. 29/407.05 |
| 2009/0259426 | A1 | 10/2009 | Gleine | |

FOREIGN PATENT DOCUMENTS

| DE | 10122092 A1 | 11/2002 |
|---|---|---|
| DE | 10 2006 021 574 A1 | 11/2007 |
| DE | 202008013438 U1 | 2/2010 |
| FR | 2788743 A1 | 7/2000 |

OTHER PUBLICATIONS

European Search Report corresponding to European Application No. 12 17 0183, dated Nov. 14, 2014, 8 pages.

* cited by examiner

*Primary Examiner* — Lee D Wilson
*Assistant Examiner* — Jamal Daniel
(74) *Attorney, Agent, or Firm* — Carter, DeLuca, Farrell & Schmidt, LLP (57) ABSTRACT

Disclosed is a jig for the modelling of at least one section of an aircraft fuselage, with a framework structure and with a multiplicity of adapters for the connection of stiffening elements to the framework structure, which can be moved relative to the framework structure, and/or with a multiplicity of adapters for the modelling of profiles of stiffening elements, which can be moved relative to the framework structure.

14 Claims, 11 Drawing Sheets

JIG FOR THE MODELLING OF AT LEAST ONE SECTION OF AN AIRCRAFT FUSELAGE

TECHNICAL FIELD

The invention concerns a jig for the modelling of at least one section of an aircraft fuselage.

BACKGROUND OF RELATED ART

Such jigs/rigs, designated as demonstrators, are regularly deployed in an aircraft development programme for purposes of creating a model at a 1:1 scale of a fuselage or a fuselage section. The demonstrators are conventionally static mock-ups constructed in wood or aluminium and thus require the specification of a specific fuselage geometry, in particular with regard to cross-sectional shapes or fuselage frame spacings. However, this specification makes impossible adaptation of the mock-up in accordance with a modification of the fuselage geometry occurring in the course of aircraft development, so that for purposes of modelling a modified fuselage geometry a further mock-up must be constructed. However, the generation of a new mock-up delays aircraft development and leads to an increase in manufacturing costs.

The object of the invention is to create a jig for the modelling of at least one section of an aircraft fuselage, which removes the disadvantages cited above and enables flexible adaptation of the jig to various fuselage geometries.

SUMMARY

This object is achieved by a jig with the features of claim 1.

An inventive jig for the modelling of at least one section of an aircraft fuselage has a framework structure and a multiplicity of adapters for the connection of stiffening elements to the framework structure, which can be moved relative to the framework structure, and/or a multiplicity of adapters for the modelling of profiles of stiffening elements, which can be moved relative to the framework structure.

By means of the relatively movable adapters for the connection of stiffening elements such as fuselage frames, the inventive jig, i.e. the inventive demonstrator, enables flexible adaptation to various fuselage geometries, so that various fuselage cross-sections, i.e. fuselages, can be modelled in the jig. At the same time the alternative or additional adapters for the modelling or simulation of stiffening elements enable the stiffening elements per se, such as fuselage frames, to be dispensed with, since these at least trace out the profile of the fuselage frame in question, so that even highly complex fuselage geometries, i.e. fuselage frame profiles, can be realistically modelled. No foregoing manufacture of these highly complex fuselage frames is required. Moreover the inventive jig allows ease of modelling and simulation of particular properties and characteristics of the fuselage structure, such as e.g. tolerances on cabin mounting brackets or interfaces, such as will occur in the future as a result of the deployment of new materials and production methods. Thus the inventive jig enables the modelling of a very wide range of fuselage geometries, as a result of which, compared with the static mock-ups of known art, on the one hand aircraft development time is shortened, and on the other hand jig costs and thus manufacturing costs are reduced. Moreover installation studies and representations of cabin elements are possible even without a specific fuselage cross-section. If the two types of adapter are combined with one another this can be particularly advantageous for the development time for the aircraft, since by this means the adapters that model the stiffening elements can serve as place markers or dummies until the final shape of the fuselage frame is defined. In this manner it is possible to detect at an early stage whether the profile and shape required for the fuselage frame can be implemented. The jig costs can be further reduced if the framework structure and the adapters are designed as standard components, such that a multiplicity of fuselage geometries can be covered with a minimum number of parts.

For purposes of adapting the framework structure to different fuselage widths the adapters on the framework structure can be moved in the radial direction. The ability to move the adapters can, for example, be achieved by means of sliding members on the framework structure in which the adapters are guided. Alternatively or additionally the adapters can also be provided with an integrated system for length modification, such as a telescopic system or spindle system. Moreover the ability to move the adapters removes the need for the framework structure itself to have elements for geometry modification, as a result of which the latter can be embodied in a particularly robust manner. Needless to say, however, the framework structure can also be adjustable in the longitudinal direction, the transverse direction, and the vertical direction.

The flexibility of the jig can be further increased if the adapters on the framework structure can be moved in the circumferential direction.

The flexibility can furthermore be increased if the adapters on the framework structure are mounted such that they can be pivoted.

The adapters for the modelling of profiles of stiffening elements preferably have sections for the connection of structural elements to the framework structure. By this means the fuselage geometry in question can not only be traced out, but can also be closed by means of, for example, connected skin fields.

In order to enable the modelling of cabins, the adapters for the modelling of profiles of stiffening elements can have sections for the modelling of cabin elements, such as overhead lockers, side panelling or ceiling panelling, and similar.

Likewise in order to enable the profiling of installation lines and supply lines, the adapters for the modelling of profiles of stiffening elements can have sections for the connection of supply lines, and similar. For example, conventional cable mounting brackets can easily be secured to the sections.

A preferred framework structure has a multiplicity of framework elements extending in the transverse direction of the fuselage, which are mounted on longitudinal guideways of the jig for purposes of moving the framework elements in the longitudinal direction of the fuselage. The multiplicity of framework elements enables the number of framework elements to vary such that in each case only as many framework elements form the framework structure as are necessary for the modelling of the fuselage, or the fuselage section, in question. Here, with the ability to move the framework elements in the longitudinal direction of the fuselage in a preferably stepless manner, individual spacings between fuselage frames can be simulated, and thus the fuselage cross-section can be optimally adjusted. The possibility exists of introducing different fuselage geometries or cabins into the jig directly behind one another and side-by-side, so that they can be directly compared with respect to installation, comfort or the use of space.

In order to take into account the positions of passenger doors, freight doors and similar, and in particular to take into account their opening and closing movements, the framework structure can have modified framework elements to be positioned near the fuselage cut-out sections provided for this purpose.

In order to achieve ease of access, in particular when modelling fuselage sections with, for example, a passenger deck and a freight compartment, the jig can have a scaffolding frame for purposes of accommodating the framework structure.

To increase the flexibility of the scaffolding frame this can be constructed in a modular manner from a multiplicity of scaffolding modules so that, depending upon the fuselage section to be modelled, only a certain number of scaffolding modules are provided. As a result of the modular form of construction of the jig structure almost any scaling of the fuselage circumference in question can be implemented.

Other advantageous examples of embodiment of the invention are the subject of further claims.

BRIEF DESCRIPTION OF THE DRAWINGS

In what follows preferred examples of embodiment of the invention are elucidated in more detail with the aid of schematic representations. Here.

DETAILED DESCRIPTION

In the figures the same constructive elements have the same reference numbers, wherein in the event of a plurality of the same constructive elements in one figure only one element is provided with a reference number in the interests of clarity.

Figure 1A:
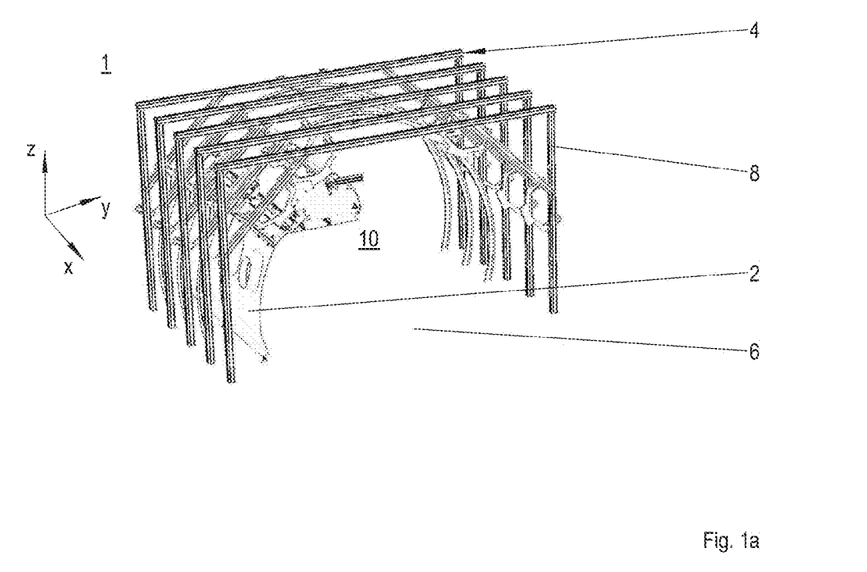
FIGS. 1a and 1b show representations of a first example of embodiment of an inventive jig.
Figure 1B:
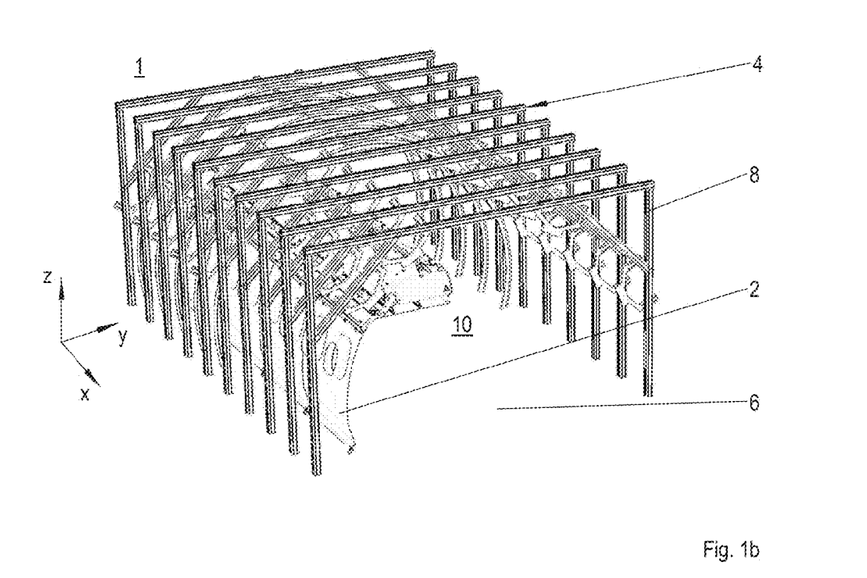

FIGS. 1a and 1b are perspective representations of a first example of embodiment of an inventive jig 1 for the modelling of at least one section of an aircraft fuselage 2. The jig 1 is a flexible demonstrator mock-up with a framework structure 4 for purposes of creating a build space 6 for the modelling of the aircraft fuselage 2, or a section of the fuselage.

The framework structure 4 is self-supporting and has a multiplicity of framework elements 8. The extent of the framework structure in the fuselage longitudinal direction x, and thus the length of the build space 6, can be flexibly adjusted in terms of the number of framework elements 8, as can be discerned in FIGS. 1a and 1b. The framework structure 4 enables both the modelling of individual aircraft decks such as a passenger cabin 10 and also, as shown in FIGS. 2a and 2b, the modelling of a fuselage cross-section with, for example, an upper passenger cabin 10 and a lower freight compartment 12.

Figure 2A:
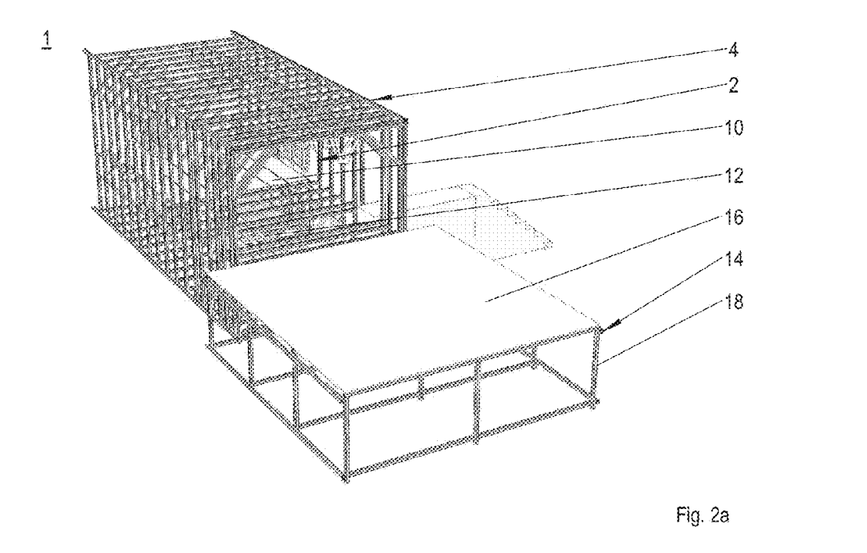
FIGS. 2a and 2b show representations of a second example of embodiment of the jig.
Figure 2B:
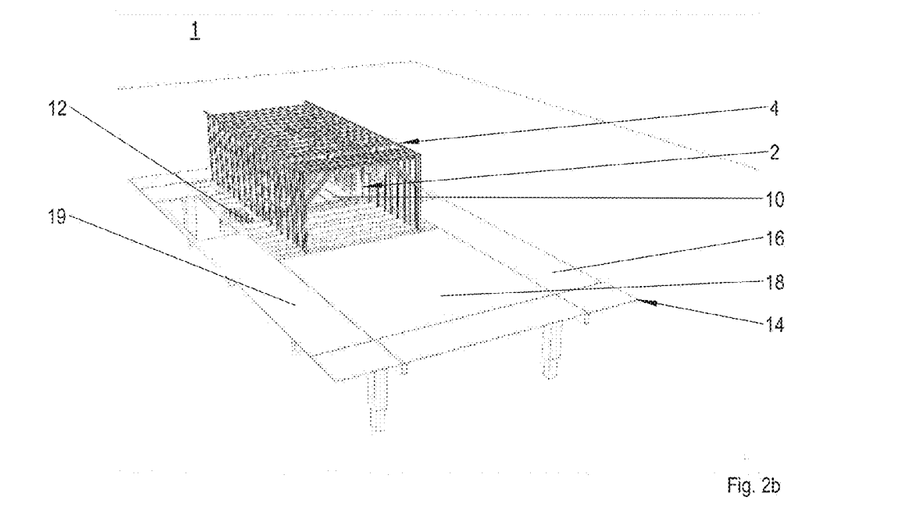

For purposes of improving the access to the aircraft fuselage 2 the jig, as shown in FIGS. 2a and 2b, can have a scaffolding frame 14, which forms a platform 16. The platform 16 is formed from a multiplicity of scaffolding modules 18, 19, which can be positioned flexibly relative to the framework structure 4. Thus the platform 16 can be simply positioned at the end face of the aircraft fuselage 2, i.e. of the framework structure 4, as shown in FIG. 2a, and can also completely encompass the periphery of the framework structure 4 and thus the aircraft fuselage 2, as shown in FIG. 2b.

Figure 3:
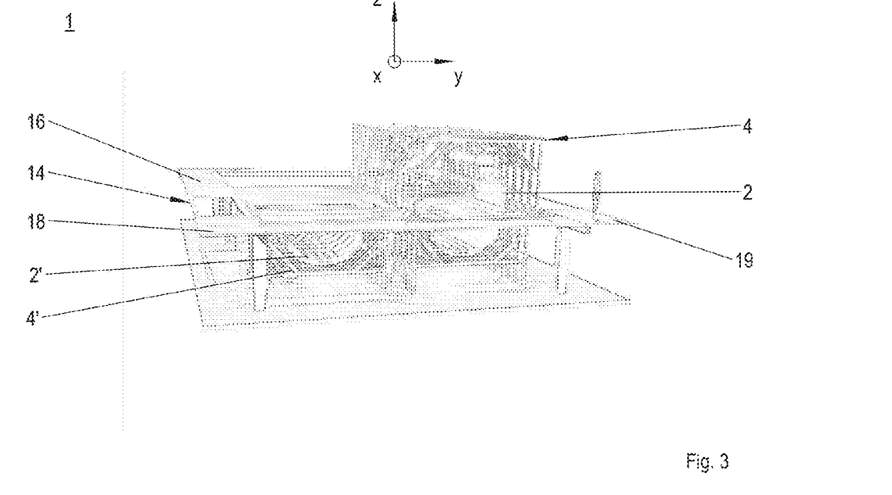
FIG. 3 shows representations of a third example of embodiment of the jig.

As shown in FIG. 3, the scaffolding frame 14 can moreover be constructed with its scaffolding modules 18, 19 such that cross-sections of a plurality of aircraft fuselages 2, 2' can be modelled side-by-side, each in a framework structure 4, 4'.

Figure 4:
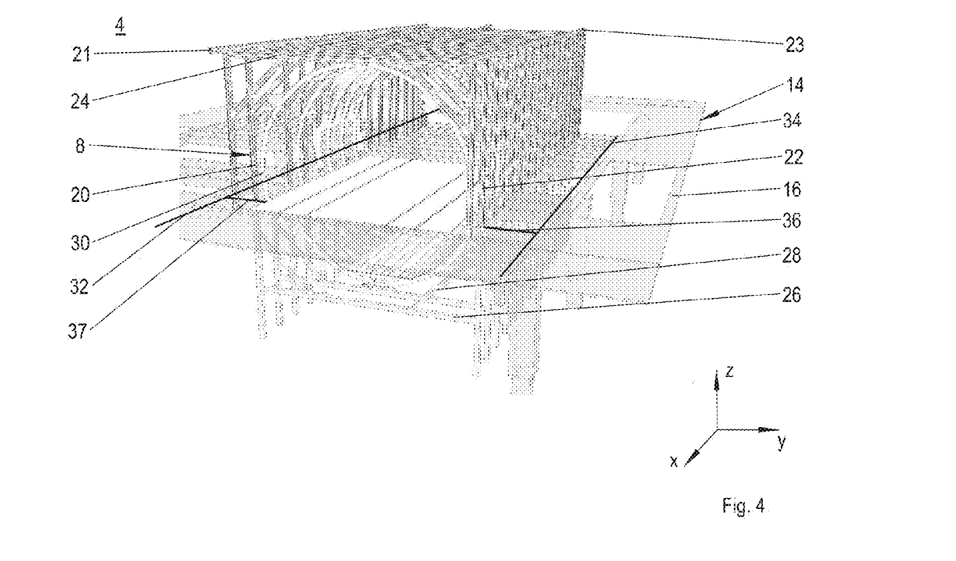
FIG. 4 shows a framework structure of the jig.

As shown in FIG. 4, the framework elements 8 of the framework structure 4 in each case have a similar structure, and are mutually stabilised by means of longitudinal beams 21, 23. In the example of embodiment shown the framework elements 8 in each case have two side supports 20, 22, which are connected with one another via an upper transverse beam 24 and also a lower transverse beam 26. For purposes of stabilising the individual framework elements 8 corner struts 28 are arranged in each of their corner regions.

Each framework element 8 symbolises the position of a fuselage frame 30. For purposes of adjusting a respective fuselage frame spacing the framework elements 8 are guided in the longitudinal direction x of the fuselage 2 such that they can slide in a stepless manner. For this purpose, in the example of embodiment shown in FIG. 4, the scaffolding frame 14 has at the height of the platform 16 two longitudinal guideways 32, 34 extending on both sides alongside the framework structure 4, i.e. as viewed in the transverse direction y, in which longitudinal guideways the framework elements 8 are guided with cantilever arms 36, 37 extending laterally from the side supports 20, 22.

Figure 5:
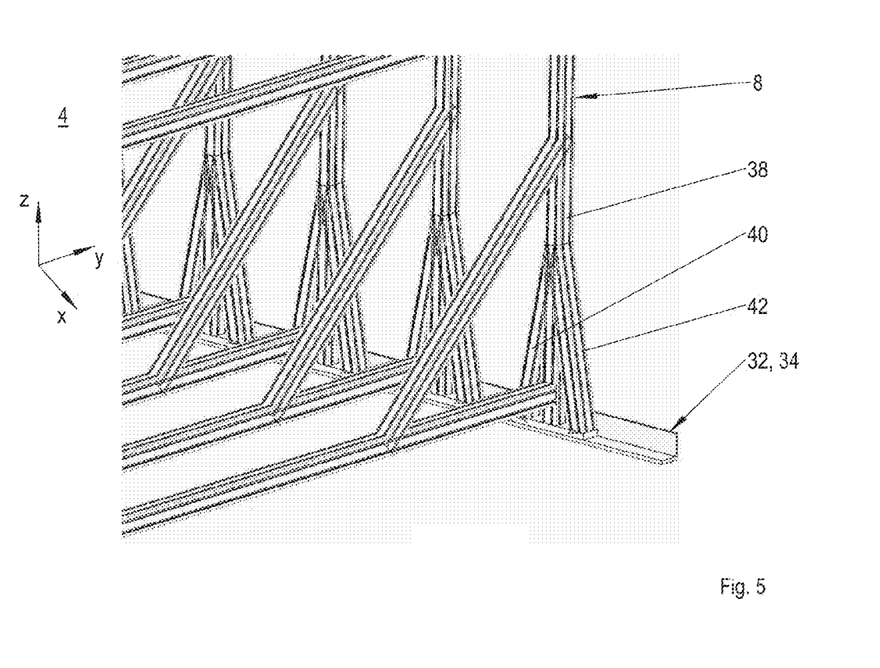
FIG. 5 shows a longitudinal guideway of the jig for purposes of modifying the spacing between individual framework elements of the framework structure.

In an alternative example of embodiment shown in FIG. 5 the longitudinal guideways 32, 34 are arranged on the floor on both sides of the framework structure 4, which with its foot sections 38 is guided in the longitudinal guideways 32, 34. For purposes of creating the largest possible seating surface and a stable seating in the longitudinal guideways 32, 34 the foot sections 38 of the framework structure 4, i.e. of the framework elements 8 can be enlarged into a triangular shape, i.e. stabilised, by means of side struts 40, 42.

Figure 6:
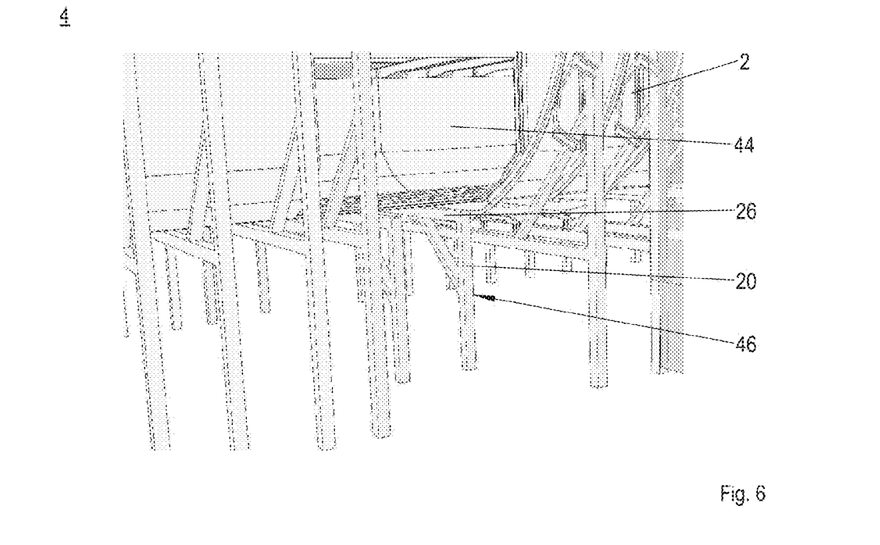
FIG. 6 shows modified framework elements for purposes of taking into account fuselage cut-out sections.

For purposes of taking into account fuselage cut-out sections 44 for the accommodation of, for example, freight doors, modified framework elements 46 are provided, as shown in FIG. 6, which form an opening in the framework structure 4 in the region of the fuselage cut-out section 44, and thus create lateral access to the aircraft fuselage 2. The modified framework elements 46 for purposes of modelling the fuselage cut-out section 44 have, for example, a shortened lower transverse beam 26 and in the region of the fuselage cut-out section 44 have no continuous side support, but instead a shortened side support 20.

Figure 7:
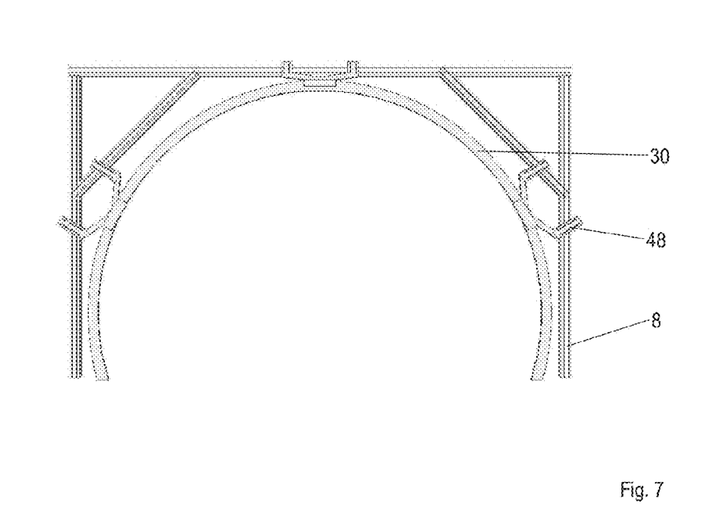
FIG. 7 shows adapters for purposes of connecting a stiffening element to a framework element.
Figure 8:
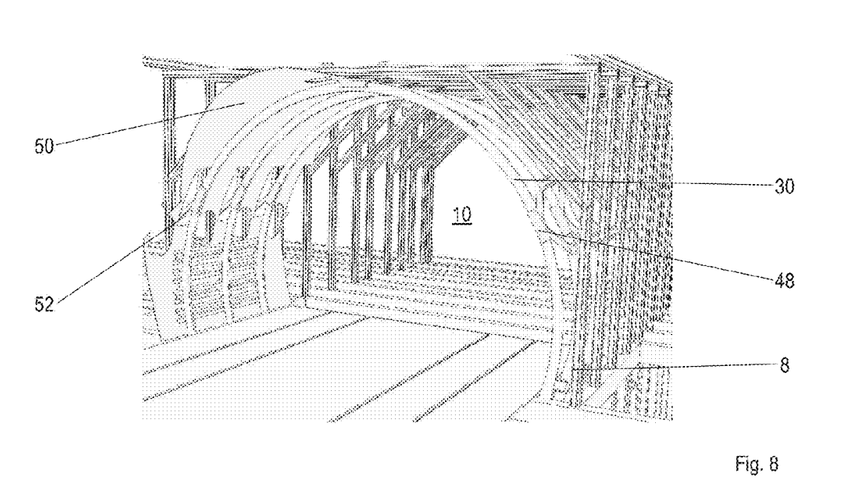
FIGS. 8, 9 and 10 show examples of uses of the adapters.

For purposes of connecting a fuselage frame 30 in each case to a framework element 8, as shown in FIG. 7, a multiplicity of adapters 48 are provided. In the example of embodiment shown three adapters 48 are provided. As shown in FIG. 8 they allow the modelling of a passenger deck 10 including skin fields 50 connected to the fuselage frames 30. For purposes of guiding the adapters 48 through the skin fields 50 the latter can have appropriate openings 52.

Figure 9:
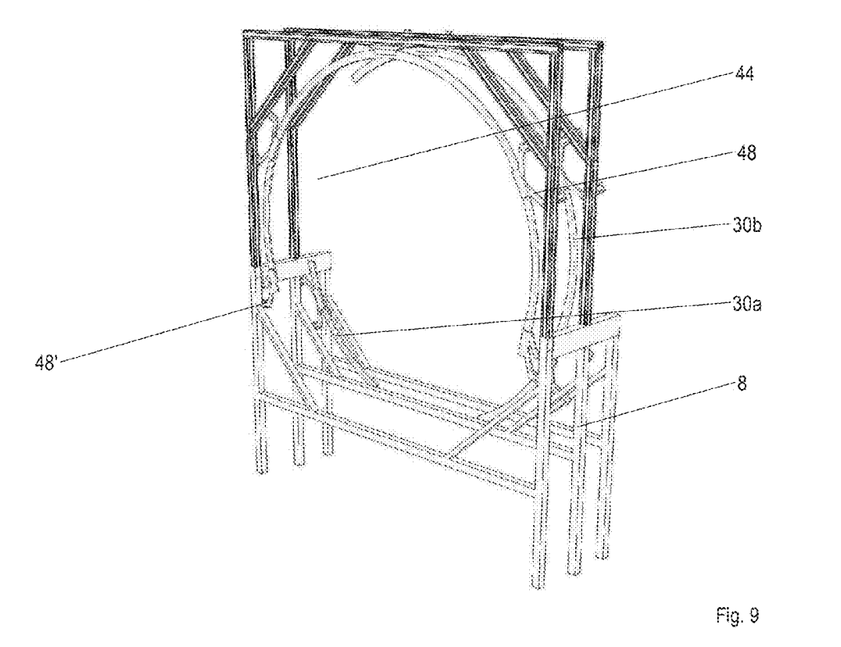

Moreover the adapters 48 allow, as shown in FIG. 9, the accommodation of individual fuselage frame sections 30a, 30b to take into account fuselage cut-out sections 44.

Figure 10:
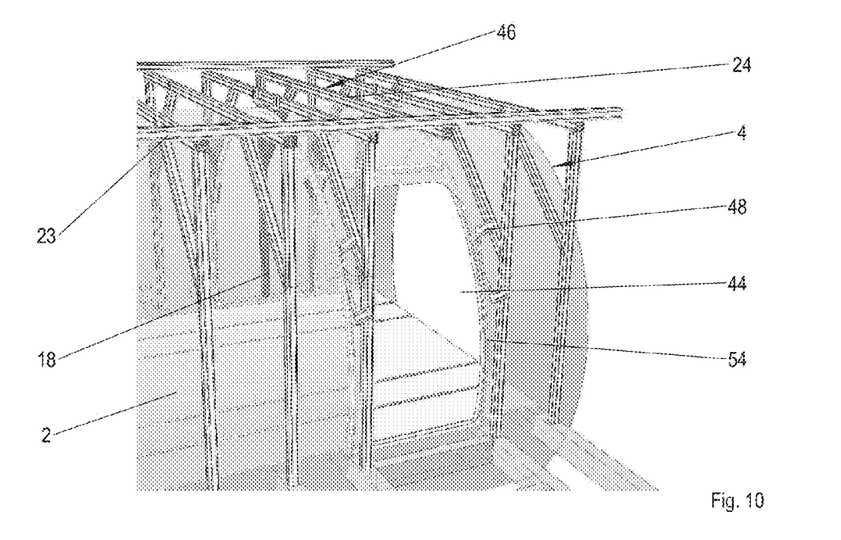

As shown in FIG. 10, in addition to the connection of stiffening elements embodied as fuselage frames 30, the adapters 48 furthermore allow the direct connection of stiffening elements embodied as passenger and freight door frames 54. As can likewise be discerned in FIG. 10 and already mentioned, in the region of the fuselage cut-out section 44 of the fuselage 2 a modified, and in this case gallows-like, framework element 46 is arranged with a side support 18 opposite to the fuselage cut-out section 44. No side support 18, 20 is positioned in the region of the fuselage cut-out section 44 so as to allow a side opening to be formed in the framework structure 4. For purposes of supporting the framework element 46 in the region of the fuselage cut-out section 44 the free end of its upper transverse beam 24 can be connected to the longitudinal beam 23.

Figure 11:
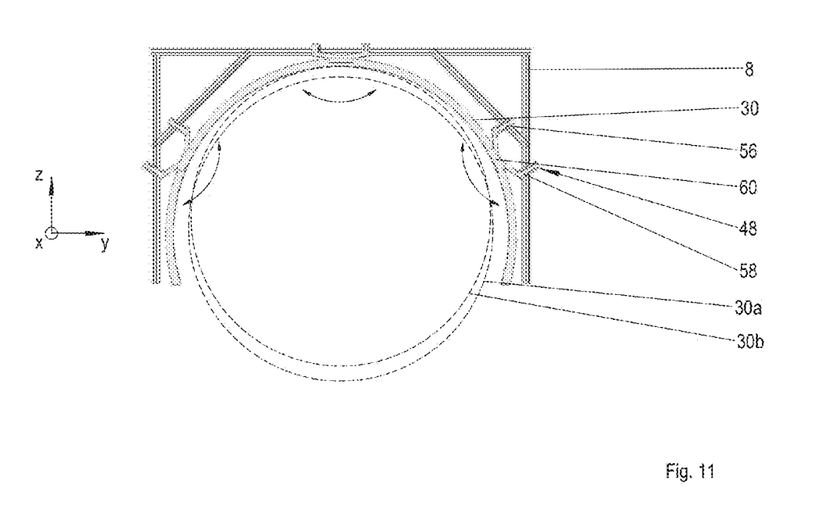
FIG. 11 shows possible movements of the adapters relative to a framework element.

As shown in FIG. 11 in one example of embodiment the adapters 48 are provided in the form of a yoke, in each case with two foot sections 56, 58 for connection to the framework elements 8, and with one head section 60 for the accommodation of the respective stiffening element 30. For the accommodation of fuselage frames 30, 30a, 30b of various geometries or with a differing extent in the transverse direction y and in the vertical direction z the adapters 48 can be steplessly traversed, i.e. moved, relative to the respective framework element 8 in the radial direction and in the circumferential direction. Moreover the adapters 48 in each case can be pivoted about an axis of rotation extending parallel to the longitudinal axis x.

Figure 12A:
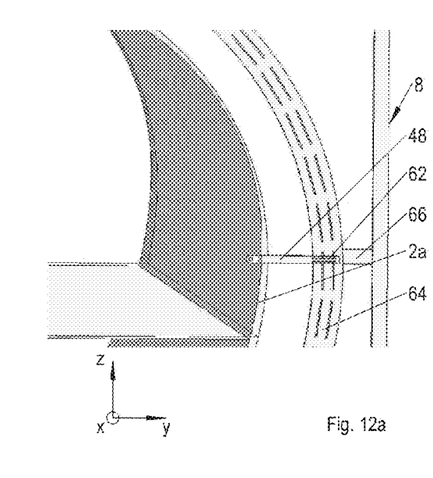
FIGS. 12a and 12b show a sliding member for purposes of enabling a radial displacement of the adapters relative to a framework element.
Figure 12B:
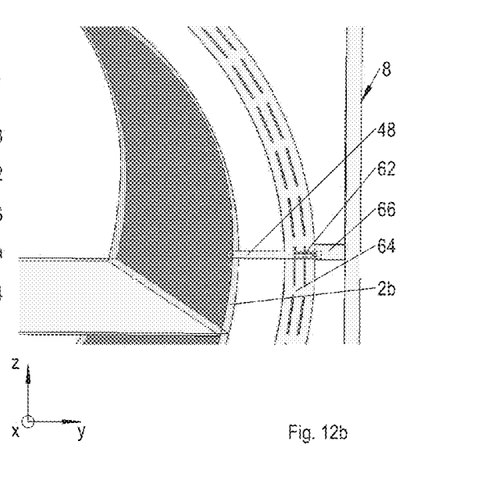

In one example of embodiment shown in FIGS. 12a and 12b sliding members 62 are fitted on the framework element to provide mobility, i.e. a sliding capability, in the radial direction; these extend in the radial direction and the adapters 48 are guided in these sliding members such that they can slide relative to the framework element 8. Thus in the case of a wide-body fuselage 2a the adapters 48 are retracted and are thus located radially outwards. In the case of a narrow-body fuselage 2b the adapters 48 are extended and are located radially inwards.

As likewise represented in FIGS. 12a and 12b both the adapters 48 and the framework elements 6 can have a modified geometry. For example, the adapters 48 can have an elongated profile and the framework elements 8 in each case can have an inner radially curved flange 64 for purposes of connecting the adapters 48, i.e. the sliding members 62; the flange is secured via transverse struts 66 to the side supports 18, 20 and at least to the upper transverse beam 24.

Figure 13:
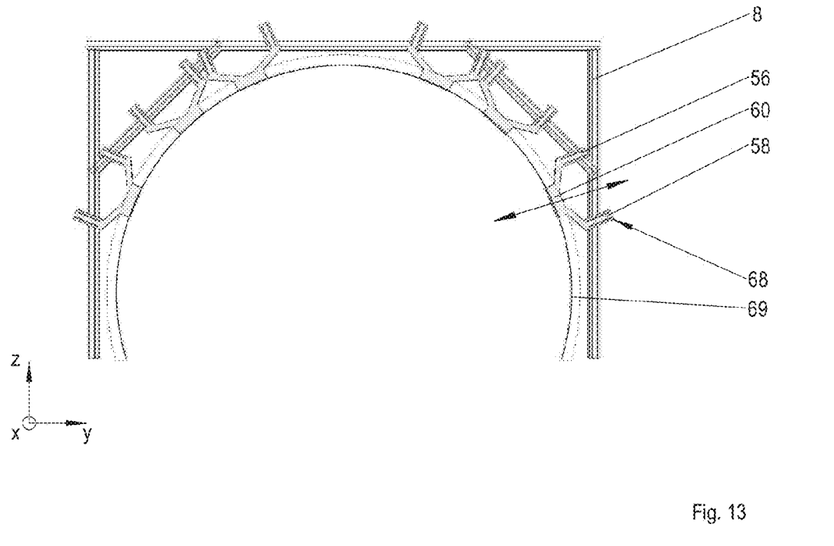
FIG. 13 shows modified adapters for the modelling of profiles of stiffening elements and their possible movements relative to a framework element.

As shown in FIG. 13 the jig 1 has a multiplicity of modified adapters embodied as fuselage frame emulators 68. The fuselage frame emulators 68 can in each case move relative to the framework elements 8 in the radial direction and in the circumferential direction, and can in each case be pivoted about an axis of rotation extending parallel to the longitudinal axis x. In the example of embodiment shown they have a shape in the form of a yoke with two foot sections 56, 58 for connection to the framework elements 8 and with one head section 60 for purposes of modelling, i.e. simulating, a fuselage frame profile 69.

Figure 14:
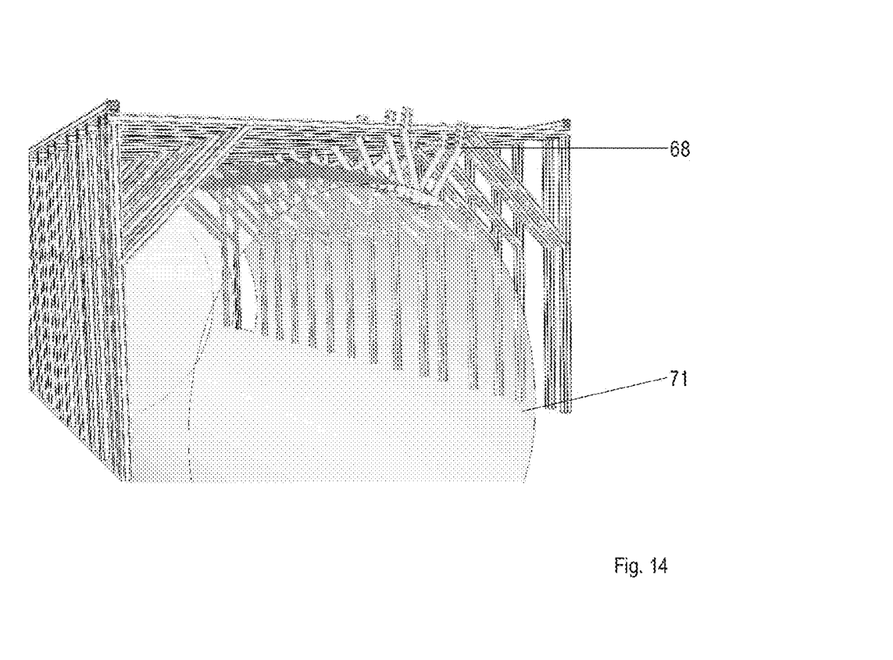
FIGS. 14, 15 and 16 show examples of uses of the modified adapters.

With an appropriate number of fuselage frame emulators 68, not only individual fuselage frame profiles 69 can be modelled, i.e. simulated, as shown in FIG. 14, but likewise a fuselage profile 71.

Figure 15:
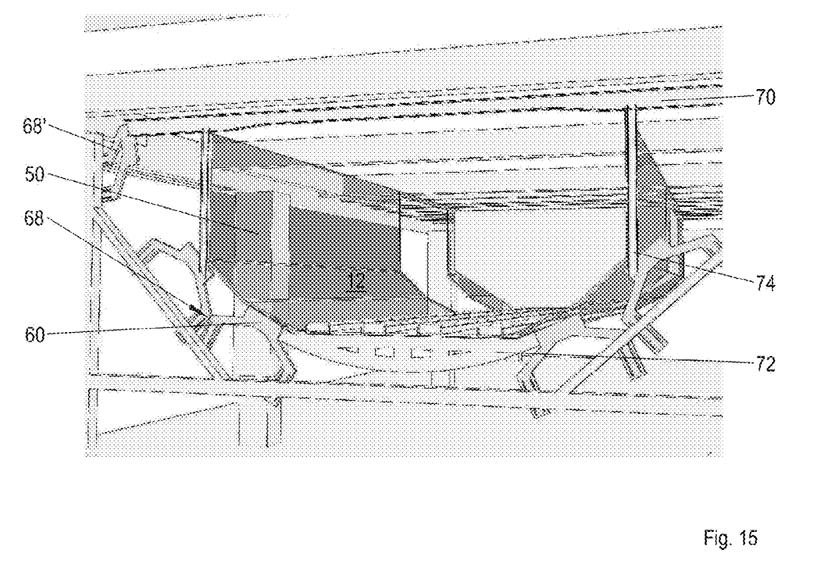

As represented in FIG. 15, structural elements such as transverse beams 70, freight compartment floor beams 72, skin fields 50, and vertical supports such as Samer rods 74, can be connected to the head sections 60 of the fuselage frame emulators 68, and in this manner, for example, a freight compartment 12 can be modelled.

Figure 16:
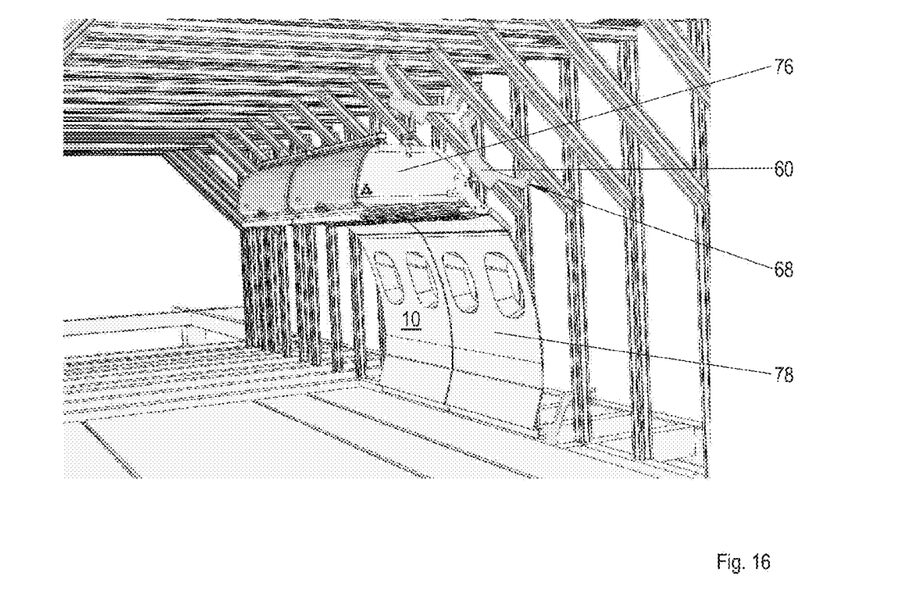

As represented in FIG. 16, cabin elements such as overhead lockers 76, and side panelling 78 can be connected to the head sections 60 of the fuselage frame emulators 68, and in this manner, for example, a passenger cabin 10 can be modelled.

Figure 17:
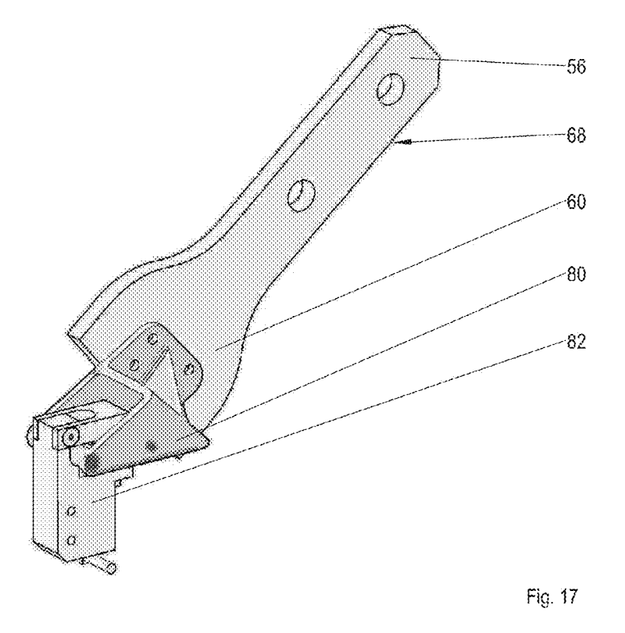
FIG. 17 shows a detailed representation of an example of embodiment of the modified adapter for the connection of cabin elements.

In order to take accurate account of, for example, installation and component tolerances, as shown in the example of embodiment shown in FIG. 17, cabin mounting brackets 80 and original component mounting brackets 82 are preferably used to connect the cabin elements 76, 78.

As can also be discerned from FIG. 17, the geometry of the fuselage frame emulator 68 can vary and is not limited to the shape of a yoke. Thus the fuselage frame emulators 68 can also be provided in an elongated manner with just one foot section 56 for connection to the framework elements 8 and with a widened head section 60 for the accommodation, for example, of the cabin mounting brackets 80.

Figure 18:
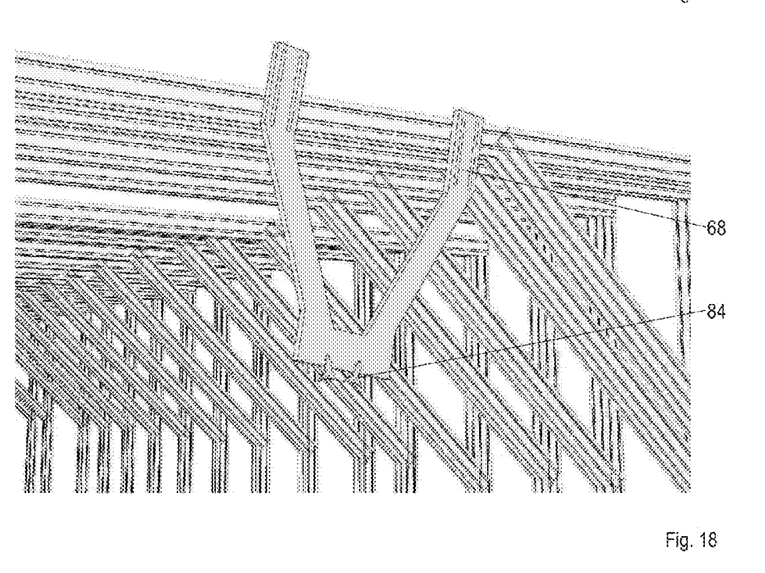
FIG. 18 shows a further example of use of the modified adapters.

The fuselage frame emulators 68 can moreover, as shown in FIG. 18, likewise serve to accommodate cable mounting brackets 84, and can thus serve to model routings of installation lines, i.e. supply lines, such as data cables, power supply cables, etc. Moreover air conditioning pipes, not shown, can be arranged on the fuselage frame emulators 68 for purposes of modelling an air conditioning system.

Figure 19A:
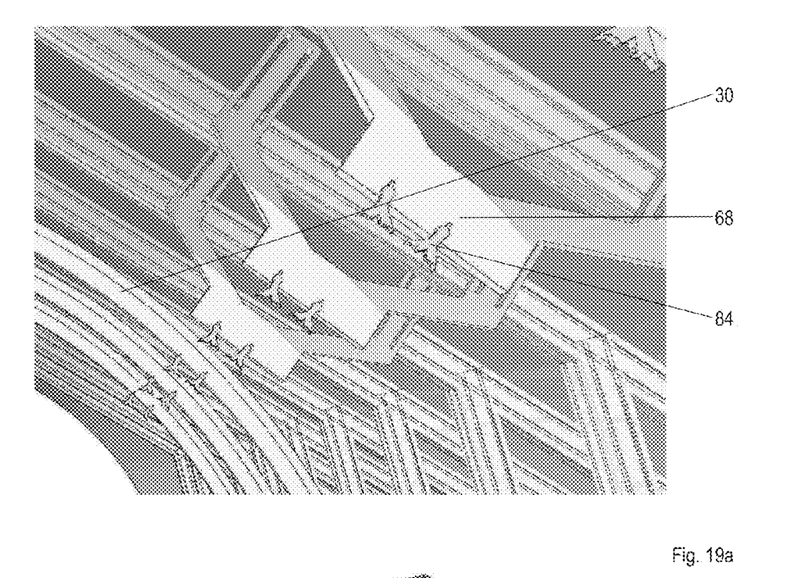
FIGS. 19a and 19b show examples of combinations of the adapters.
Figure 19B:
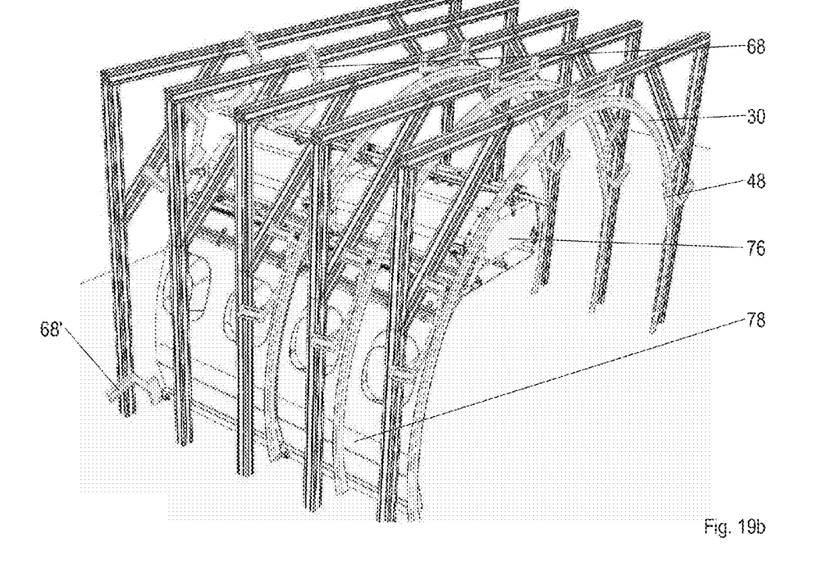

As shown in FIGS. 19a and 19b, the adapters 48 and the fuselage frame emulators 68 can be freely combined with one another within one framework structure 4, thus providing the maximum possible flexibility for the jig 1. Thus, for example, cable mounting brackets 84 (FIG. 19a) can be connected to the fuselage frames 30 carried by the adapters 48, and also to the fuselage frame emulators 68. Similarly, cabin elements 76, 78 (FIG. 19b) can be arranged on the fuselage frames 30 carried by the adapters 48, and also on the fuselage frame emulators 68.

As can be seen by virtue of the above description, the shape, number and the free combination of the scaffolding modules 18, the framework elements 8, the modified framework elements 46, the adapters 48, and the fuselage frame emulators 68 can be varied and adjusted to suit the particular fuselage geometry 2, 2a, 2b to be modelled. In conclusion, reference is made to FIGS. 9, 14, and 19b, in which examples of embodiment 48', 68' of the adapter 48 and the fuselage frame emulator 68 are represented with foot sections 56, 58 that are closely spaced apart from one another, so that these do not have a profile in the form of a yoke, or a C-shaped profile, but instead a quasi L-shaped profile.

Disclosed is a jig for the modelling of at least one section of an aircraft fuselage, with a framework structure and with a multiplicity of adapters for the connection of stiffening elements to the framework structure, which can be moved relative to the framework structure, and/or with a multiplicity of adapters for the modelling of profiles of stiffening elements, which can be moved relative to the framework structure.

The invention claimed is:

1. A jig for modelling at least one section of an aircraft fuselage comprising:
    a framework structure including a multiplicity of framework elements extending in a transverse direction of the fuselage;
    wherein the framework structure includes longitudinal guideways for moving the framework elements in a longitudinal direction of the fuselage;
    wherein the framework elements are slidably mounted on the longitudinal guideways such that individual spacings between the framework elements can be steplessly adjusted;
    a first multiplicity of adapters for connection of stiffening elements to the framework structure, which are attached to the framework elements and which can be moved relative to the framework elements; and
    a second multiplicity of adapters embodied as fuselage frame emulators for simulating a frame profile, which are attached to the framework elements and which are movable relative to the framework elements.

2. The jig in accordance with claim 1, wherein the first multiplicity of adapters on the framework structure can be moved in a radial direction.

3. The jig in accordance with claim 1, wherein the first multiplicity of adapters on the framework structure can be moved in a circumferential direction.

4. The jig in accordance with claim 1, wherein the first multiplicity of adapters on the framework structure are mounted such that they can be pivoted.

5. The jig in accordance with claim 1, wherein the framework structure includes modified framework elements to be positioned near fuselage cut-out sections.

6. The jig in accordance with claim 1, further comprising a scaffolding frame for accommodating the framework structure.

7. The jig in accordance with claim 6, wherein the scaffolding frame includes scaffolding modules that can be moved relative to one another.

8. The jig in accordance with claim 1, further comprising a third multiplicity of adapters for modelling of profiles of stiffening elements, which can be moved relative to the framework structure.

9. The jig in accordance with claim 8, wherein the third multiplicity of adapters for modelling of profiles of stiffening elements on the framework structure can be moved in a radial direction.

10. The jig in accordance with claim 8, wherein the third-multiplicity of adapters for modelling of profiles of stiffening elements on the framework structure can be moved in a circumferential direction.

11. The jig in accordance with claim 8, wherein the third multiplicity of adapters for modelling of profiles of stiffening elements on the framework structure are mounted such that they can be pivoted.

12. The jig in accordance with claim 8, wherein the third multiplicity of adapters for modelling of profiles of stiffening elements include sections for a connection of structural elements to the framework structure.

13. The jig in accordance with claim 8, wherein the third multiplicity of adapters for modelling of profiles of stiffening elements include sections for a connection of cabin elements to the framework structure.

14. The jig in accordance with claim 8, wherein the third multiplicity of adapters for modelling of profiles of stiffening elements include sections for a connection of supply lines.

* * * * *